United States Patent [19]
Wong

[11] Patent Number: 5,994,842
[45] Date of Patent: Nov. 30, 1999

[54] FLASHING LIGHT ASSEMBLY FOR A MICROPHONE

[76] Inventor: Mu-Keng Wong, No. 29, An Ho St., Chia I City, Taiwan

[21] Appl. No.: 09/004,850

[22] Filed: Jan. 9, 1998

[51] Int. Cl.[6] ............................. F21V 33/00; H05B 37/00
[52] U.S. Cl. .............................. 315/76; 315/129; 362/86; 362/276
[58] Field of Search .............................. 315/363, 76, 147, 315/129, 291; 362/86, 109, 253, 276; 381/91, 122, 168

[56] References Cited

U.S. PATENT DOCUMENTS 3,005,905  10/1961  Libson ...................................... 362/86

Primary Examiner—David H. Vu
Attorney, Agent, or Firm—Rosenberg, Klein & Bilker

[57] ABSTRACT

The present invention relates to a flashing light assembly for a microphone, which consists of a collar located on the grid ring frame of the shell of the microphone. More than two light emitting diodes and an electric circuit are also included. There are several socket-rings attached to the circumference of the collar for holding the variably colored light emitting diodes respectively therein. The light emitting diodes are connected to the electric circuit, which is connected to a switch for switching over the light emitting diodes to either light or flash in accordance with the sound picked by the microphone.

1 Claim, 5 Drawing Sheets

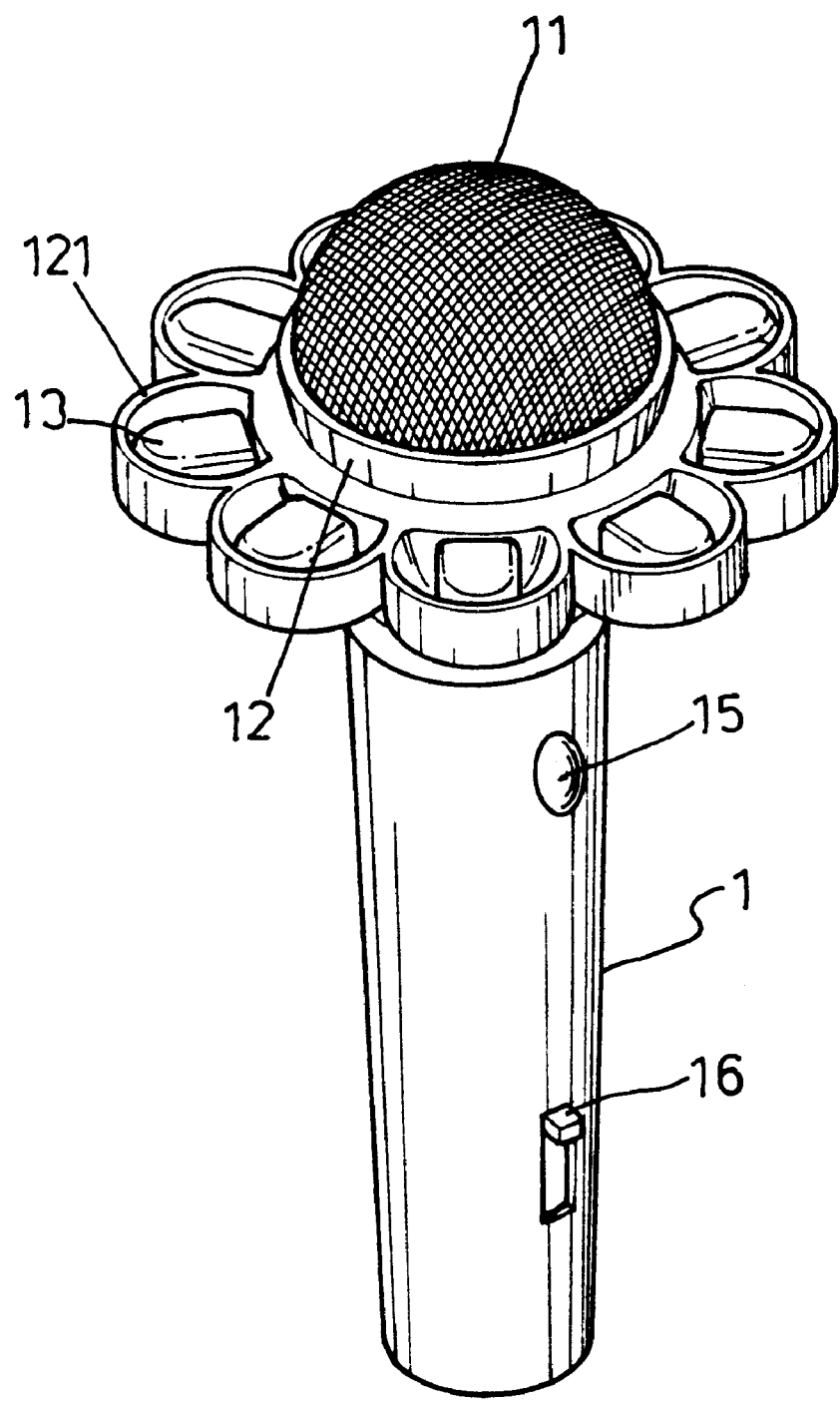
F I G. 1

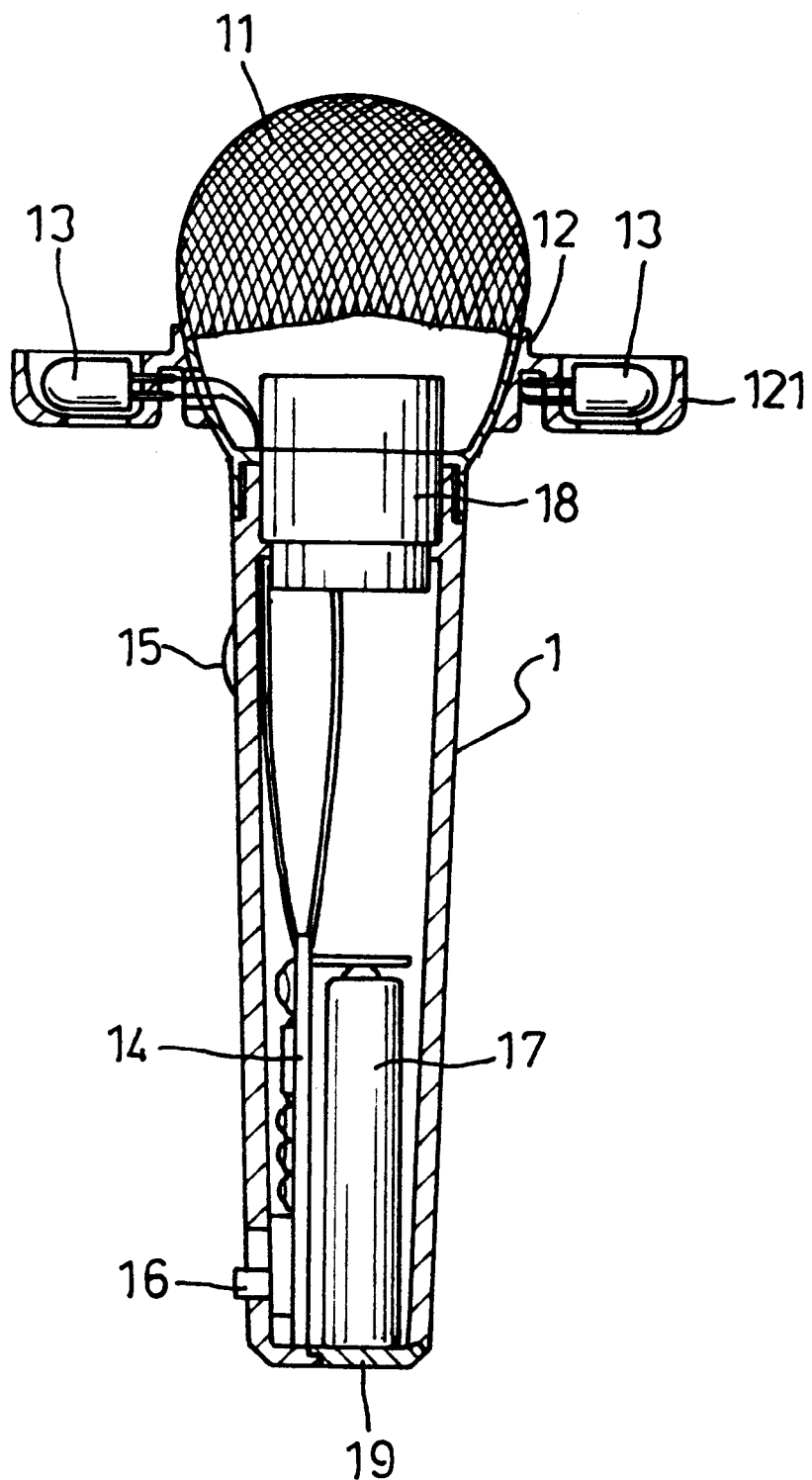
F I G. 3

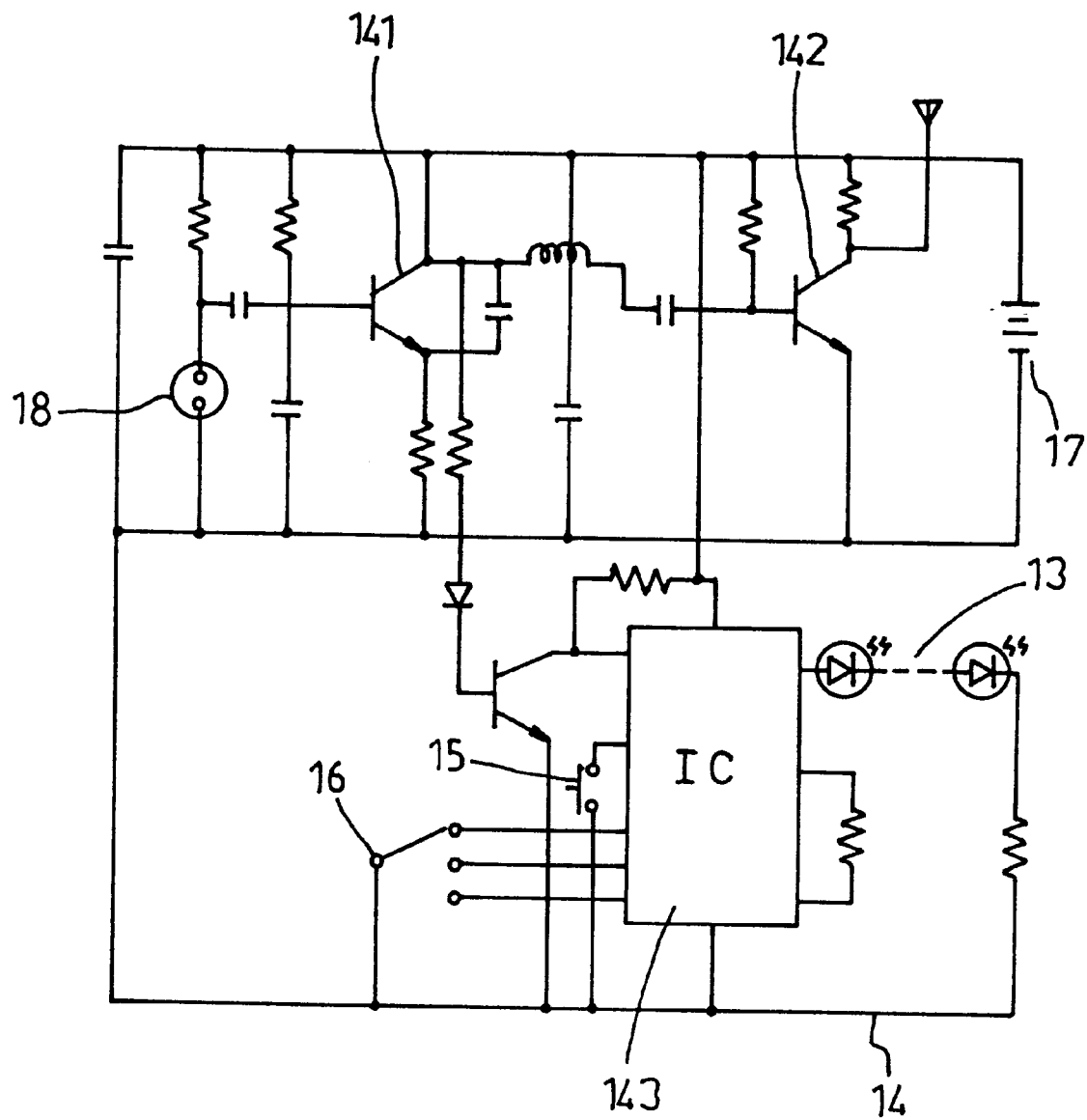
F I G. 4

FLASHING LIGHT ASSEMBLY FOR A MICROPHONE

BACKGROUND OF THE INVENTION

1. Field of the Invention

The present invention relates to a flasher for a microphone, and more particularly to a flasher attached to a microphone and includes variably colored light emitting diodes, wherein using the microphone causes the flasher to emit light or flash.

2. Prior Art

In accordance with modern life, television helps people, in their spare time, extricate themselves from their intense work and life. A microphone is used for picking up sound, but most of the microphones commonly used by singers appear cold and dull, and cannot increase the amusing atmosphere.

SUMMARY OF THE INVENTION

It is therefore a main object of the present invention to provide a flasher attached to a microphone that can emit light or flash actively to generate an amusing effect.

This object is achieved by a flasher consisting of a collar attached on the grid ring frame of a microphone. More than two light emitting diodes are fixed on the outside of the collar, and an electric circuit connected to the light emitting diodes controlled by a switch shunted on the microphone for switching over the light emitting diodes to either light or flash, driven by the sound picked up by the microphone.

BRIEF DESCRIPTION OF THE DRAWINGS

FIG. 1 is a perspective view of the present invention;

FIG. 3 is a cross-section view of the present invention;

FIG. 4 is a schematic circuit diagram of the present invention; and,

DETAILED DESCRIPTION OF THE PREFERRED EMBODIMENTS

Figure 2:
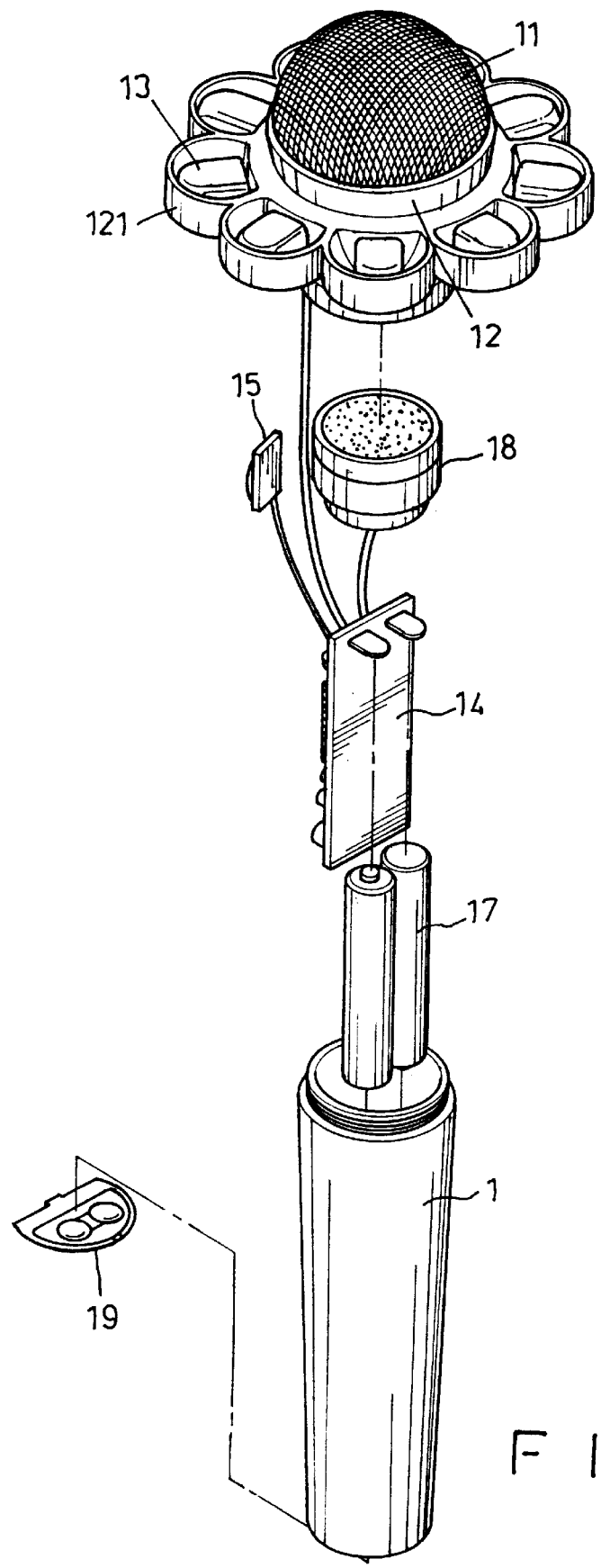
FIG. 2 is an exploded view of the present invention.

Referring to FIG. 1 to FIG. 3, the present invention consists of a collar 12 attached on the grid ring frame 11 of the shell 1 of the microphone, more than two light emitting diodes 13, an electric circuit 14, a button switch 15, a switch 16, cooperating with a battery 17, a microphone 18 and a bottom cap 19. Wherein the collar 12 is located on the grid ring frame 11, and there are several socket-rings 121 stuck on the circumference of the collar 12 for holding the variably colored light emitting diodes 13 in respectively, the light emitting diodes 13 are connected in series, and connected to the electric circuit 14, which is connected to the button switch 15, the switch 16 and the microphone 18. The battery 17 supplies the power for operation of the electric circuit 14.

Referring to FIG. 4, there is shown the electric circuit 14, which connects to the light emitting diodes 13, the button switch 15, the switch 16, the battery 17 and the microphone 18. The electric circuit 14 includes transistors 141, 142 cooperating with peripheral circuit components including resistors, capacitors and inductors, and other electric components (unmarked in drawings) forming a transmission circuit, by which the sound signal picked up by the microphone 18 is transmitted out, and the sound signal is amplified by the transistor 141 to input to a microprocessor IC 143, in which not only an oscillating signal is created, but also the sound signal is delayed to trigger the light emitting diodes 13 to flash, via the switch 16 to control flashing of the light emitting diodes 13 in accordance with the strength of the sound signal, further to increase interest in the singing.

Figure 5:
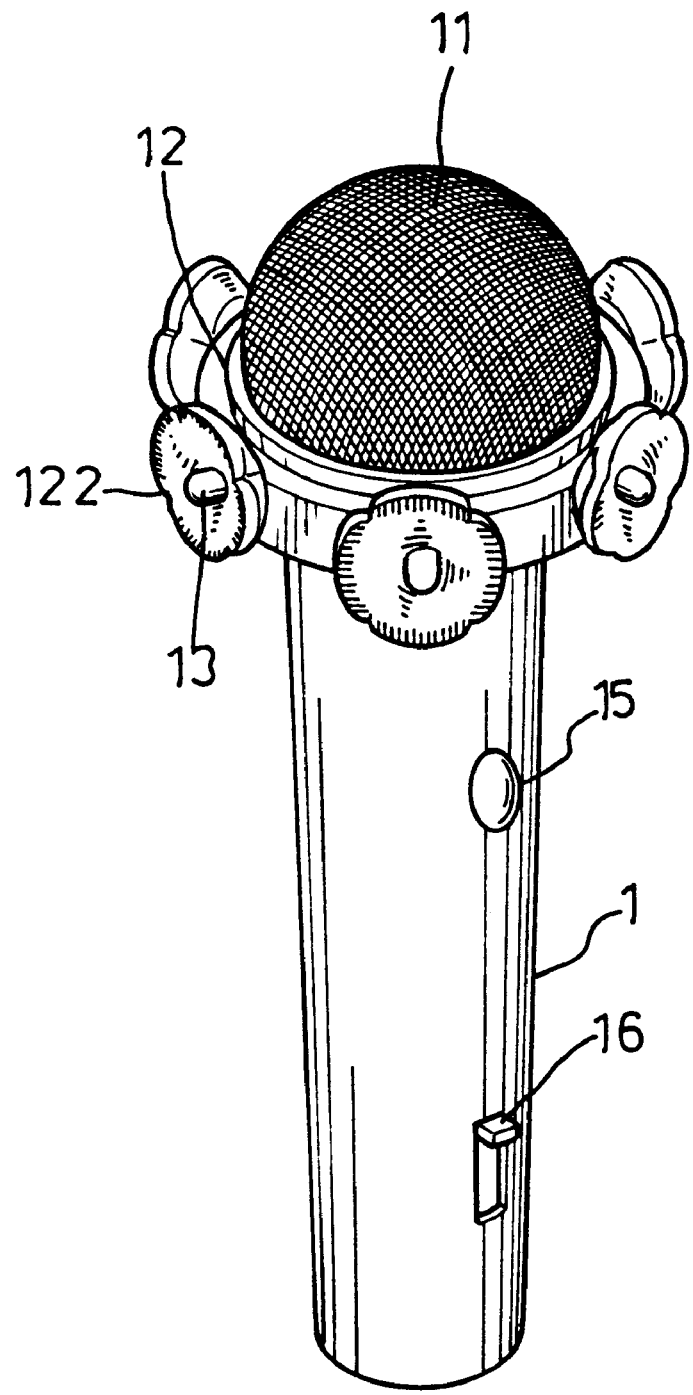
FIG. 5 is a perspective view showing another configuration of the present invention.

As shown in FIG. 5, another configuration of the present invention is shown where the socket-rings 121 are replaced with flower-shaped socket-seats 122 for holding the light emitting diodes 13 therein.

I claim:

1. A flasher for a microphone consisting of a collar located on a grid ring frame of a shell of a microphone, more than two light emitting diodes and an electric circuit, wherein several socket-rings are attached on the circumference of the collar for holding the light emitting diodes respectively therein, the light emitting diodes are connected to the electric circuit, which is connected to a switch switching over the light emitting diodes to either light or flash in accordance with the sound picked up by the microphone.

* * * * *